United States Patent
Park

(10) Patent No.: US 12,503,108 B2
(45) Date of Patent: Dec. 23, 2025

(54) DEVICE AND METHOD FOR CONTROLLING VEHICLE

(71) Applicants: Hyundai Motor Company, Seoul (KR); Kia Corporation, Seoul (KR)

(72) Inventor: Geon Hyeong Park, Seoul (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 253 days.

(21) Appl. No.: 18/210,403

(22) Filed: Jun. 15, 2023

(65) Prior Publication Data

US 2024/0199008 A1 Jun. 20, 2024

(30) Foreign Application Priority Data

Dec. 14, 2022 (KR) .................. 10-2022-0175187

(51) Int. Cl.
*G06V 20/58* (2022.01)
*B60W 30/12* (2020.01)
*B60W 40/072* (2012.01)
*G06V 20/56* (2022.01)

(52) U.S. Cl.
CPC .......... *B60W 30/12* (2013.01); *B60W 40/072* (2013.01); *G06V 20/588* (2022.01); *B60W 2420/403* (2013.01); *B60W 2520/06* (2013.01); *B60W 2552/30* (2020.02); *B60W 2552/50* (2020.02); *B60W 2552/53* (2020.02); *B60W 2554/80* (2020.02)

(58) Field of Classification Search
CPC .. G06V 20/588; B60W 30/12; B60W 40/072; B60W 2552/53; B60W 2552/30; B60W 2554/80; B60W 2552/50; B60W 2420/403; B60W 2520/06
See application file for complete search history.

(56) References Cited

U.S. PATENT DOCUMENTS

| | | | |
|---|---|---|---|
| 2008/0183342 A1* | 7/2008 | Kaufmann | B60W 60/0061 701/1 |
| 2018/0029639 A1* | 2/2018 | Taniguchi | B60R 16/0231 |
| 2020/0125861 A1* | 4/2020 | Sota | B62D 15/025 |

* cited by examiner

*Primary Examiner* — Jacob M Amick
(74) *Attorney, Agent, or Firm* — Banner & Witcoff, Ltd.

(57) ABSTRACT

Disclosed is a vehicle control device including at least one sensor, a controller, and memory. The vehicle control device acquires, using the at least one sensor, information about at least one of: a lane in which the vehicle is traveling, or a guardrail adjacent to the vehicle, determines, based on the information, whether a travel direction of the vehicle corresponds to at least one of the lane or the guardrail, and corrects the travel direction of the vehicle based on a determination that the travel direction does not correspond to at least one of the lane or the guardrail.

20 Claims, 5 Drawing Sheets

DEVICE AND METHOD FOR CONTROLLING VEHICLE

CROSS-REFERENCE TO RELATED APPLICATION

This application claims the benefit of priority to Korean Patent Application No. 10-2022-0175187, filed in the Korean Intellectual Property Office on Dec. 14, 2022, the entire contents of which are incorporated herein by reference.

TECHNICAL FIELD

The present disclosure relates to a device and a method for controlling a vehicle, and more particularly, to a technology for correcting a travel direction of the vehicle.

BACKGROUND

Various error correction processes are being developed for autonomous driving of a vehicle. For example, various techniques for correcting a travel speed or a travel direction of the vehicle based on various data are in development.

In particular, when the vehicle performs the autonomous driving in a situation in which a driver does not or cannot intervene, the vehicle has to travel in parallel along a driving lane to prevent an unintended accident in advance. Accordingly, various technologies for appropriately correcting the travel direction are being used.

SUMMARY

The present disclosure has been made to solve the above-mentioned problems occurring in the prior art while advantages achieved by the prior art are maintained intact.

The present disclosure provides devices and methods for controlling a vehicle that correct a travel direction by quickly identifying a relationship between a driving state of a host vehicle and a line of the host vehicle.

The present disclosure provides devices and methods for controlling a vehicle that enable autonomous driving in a safe travel environment by accurately identifying a correlation with an external object (e.g., a guardrail) existing in front of and at the rear of a host vehicle or a line.

The present disclosure provides devices and methods for controlling a vehicle that identify a relatively sophisticated and precise vehicle travel direction and predict a degree of correction by acquiring information about a travel environment using at least one camera.

The technical problems to be solved by the present disclosure are not limited to the aforementioned problems, and any other technical problems not mentioned herein will be clearly understood from the following description by those skilled in the art to which the present disclosure pertains.

According to one or more embodiments of the present disclosure, a device for controlling a vehicle, the device may include: at least one sensor; a controller; and memory storing instructions that, when executed by the controller, cause the device to: acquire, using the at least one sensor, information about at least one of: a lane in which the vehicle is traveling, or a guardrail adjacent to the vehicle; determine, based on the information, whether a travel direction of the vehicle corresponds to at least one of the lane or the guardrail; and correct the travel direction of the vehicle based on a determination that the travel direction does not correspond to at least one of the lane or the guardrail.

The instructions, when executed by the controller, may cause the device to determine whether the travel direction of the vehicle corresponds to at least one of the lane or the guardrail by determining, based on at least a portion of the information, whether the travel direction of the vehicle is parallel to at least one of the lane or the guardrail.

The instructions, when executed by the controller, may further cause the device to: determine, based on the information, whether the vehicle is traveling along a center line of the lane; and based on a determination that a distance between the vehicle and the center line is greater than a threshold distance, correct the travel direction of the vehicle to reduce the distance.

The instructions, when executed by the controller, may further cause the device to: monitor, based on the information, a curvature of the lane; and based on a determination that a variation range of the curvature is greater than a threshold range, correct the travel direction of the vehicle to reduce the variation range.

The instructions, when executed by the controller, may further cause the device to determine that the travel direction does not correspond to at least one of the lane or the guardrail based on at least a portion of the information indicating that a reliability value of the lane is less than or equal to a specified reference value.

The instructions, when executed by the controller, may further cause the device to: acquire, using the at least one sensor at predetermined time intervals, a driving state of the vehicle; and acquire, based on the driving state satisfying a specified condition, the information.

The instructions, when executed by the controller, may cause the device to: acquire, using the at least one sensor, area information about an area adjacent to the vehicle; determine whether the guardrail is contained in the area information based on at least one of: a distance between an object, indicated by the area information, and the vehicle, a sensed signal strength of the object, or a relative speed ratio between the vehicle and the object; and acquire, based on a determination that the guardrail is contained in the area information, the information.

The at least one sensor may include at least one of: a front camera configured to acquire data about an area in front of the vehicle; or a rear camera configured to acquire data about an area behind the vehicle.

According to one or more embodiments of the present disclosure, a method may include: acquiring, by a controller and using at least one sensor, information about at least one of: a lane in which a vehicle is traveling, or a guardrail adjacent to the vehicle; determining, by the controller and based on the information, whether a travel direction of the vehicle corresponds to at least one of the lane or the guardrail; and correcting, by the controller, the travel direction of the vehicle based on a determination that the travel direction does not correspond to at least one of the lane or the guardrail.

Determining, by the controller, of whether the travel direction of the vehicle corresponds to at least one of the lane or the guardrail may include: determining, by the controller and based on the information, whether the travel direction of the vehicle is parallel to at least one of the lane or the guardrail.

Correcting, by the controller, of the travel direction may include: determining, by the controller and based on the information, whether the vehicle is traveling along a center line of the lane; and based on a determination that a distance between the vehicle and the center line is greater than a threshold distance, correcting, by the controller, the travel direction of the vehicle to reduce the distance.

Correcting, by the controller, of the travel direction may include: monitoring, by the controller and based on the information, a curvature of the lane; and based on a determination that a variation range of the curvature is greater than a threshold range, correcting, by the controller, the travel direction of the vehicle to reduce the variation range.

Determining of whether the travel direction of the vehicle corresponds least one of the lane or the guardrail may include: determining, by the controller, that the travel direction does not correspond to at least one of the lane or the guardrail based on at least a portion of the information indicating that a reliability value of the lane is less than or equal to a specified reference value.

Acquiring of the information may include: acquiring, by the controller and based on a driving state of the vehicle satisfying a specified condition, the information.

Acquiring of the information may include: acquiring, by the controller and using the at least one sensor, area information about an area adjacent to the vehicle; determining, by the controller, whether the guardrail is contained in the area information based on at least one of: a distance between an object, indicated by the area information, and the vehicle, a sensed signal strength of the object, or a relative speed ratio between the vehicle and the object; and acquiring, by the controller and based on a determination that the guardrail is contained in the area information, the information.

According to one or more embodiments of the present disclosure, a computer-readable recording medium storing instructions that, when executed by one or more processors, may cause a vehicle to perform: acquiring, using at least one sensor, information about at least one of: a lane in which the vehicle is traveling, or a guardrail adjacent to the vehicle; determining, based on the information, whether a travel direction of the vehicle corresponds to at least one of the lane or the guardrail; and correcting the travel direction of the vehicle based on a determination that the travel direction does not correspond to at least one of the lane or the guardrail.

The instructions, when executed by the one or more processors, may cause the vehicle to determine whether the travel direction of the vehicle corresponds to at least one of the lane or the guardrail by: determining, based on the information, whether the travel direction of the vehicle is parallel to at least one of the lane or the guardrail.

The instructions, when executed by the one or more processors, may cause the vehicle to correct the travel direction of the vehicle by: determining whether the vehicle is traveling along a center line of the lane; and based on a determination that a distance between the vehicle and the center line is greater than a threshold distance, correcting the travel direction of the vehicle to reduce the distance.

The instructions, when executed by the one or more processors, may cause the vehicle to correct the travel direction by: monitoring, based on the information, a curvature of the lane; and based on a determination that a variation range of the curvature is greater than a threshold range, correcting the travel direction of the vehicle to reduce the variation range.

The instructions, when executed by the one or more processors, may cause the vehicle to determine whether the travel direction of the vehicle corresponds to at least one of the lane or the guardrail by: determining that the travel direction does not correspond to at least one of the lane or the guardrail based on at least a portion of the information indicating that a reliability value of the lane is less than or equal to a specified reference value.

BRIEF DESCRIPTION OF THE DRAWINGS

The above and other objects, features and advantages of the present disclosure will be more apparent from the following detailed description taken in conjunction with the accompanying drawings.

With regard to the description of the drawings, the same or similar reference numerals may be used for the same or similar components.

DETAILED DESCRIPTION

Figure 1:
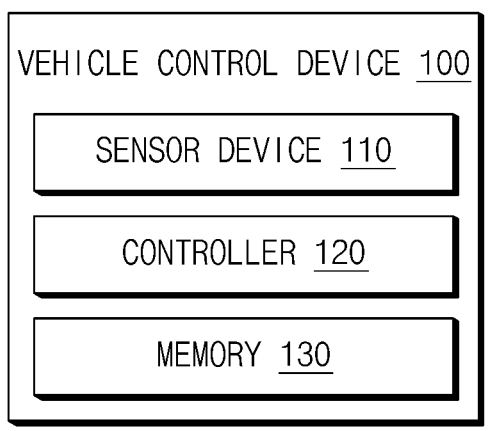
FIG. 1 is a block diagram illustrating components of a vehicle control device.

Hereinafter, some embodiments of the present disclosure will be described in detail with reference to the exemplary drawings. In adding the reference numerals to the components of each drawing, it should be noted that the identical or equivalent component is designated by the identical numeral even if they are displayed on other drawings. Further, in describing the embodiment of the present disclosure, a detailed description of the related known configuration or function will be omitted if it is determined that it interferes with the understanding of the embodiment of the present disclosure.

In describing the components of the embodiments according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Accordingly, various technologies for appropriately correcting the travel direction are being used. For example, a travel trajectory of at least one other vehicle traveling adjacent to a host vehicle may be determined, whether the host vehicle is in a parallel travel state may be determined using a relationship (e.g., a relative angle) between the collected trajectory and the lane, and the movement of the host vehicle may be controlled using the determination results.

For example, an external object (e.g., a guardrail) relative to the host vehicle may be identified using at least one sensor (e.g., a radar, a yaw rate sensor, etc.), and a travel direction of the host vehicle may be corrected via refraction compensation of the at least one sensor by inversely calculating a reflection signal emitted from the external object.

In particular, the method for correcting the travel direction using the guardrail may use lateral acceleration of the host vehicle acquired by the yaw rate sensor to determine a condition that the vehicle and the guardrail are parallel to each other. However, even when it is identified that the host vehicle and the guardrail are parallel to each other by identifying that the lateral acceleration is or is close to 0, there is a problem in that a situation in which the actual host vehicle does not travel in parallel with the guardrail occurs. Furthermore, when using such method, there is a problem in that it takes a lot of time to identify the external object or correct the travel direction because of a performance limit of the sensor.

Hereinafter, embodiments of the present disclosure will be described in detail with reference to FIGS. 1 to 5.

FIG. 1 is a block diagram illustrating components of a vehicle control device.

A vehicle control device 100 may include at least one of a sensor device 110, a controller 120, a memory 130, or any combination thereof.

The configuration of the vehicle control device 100 shown in FIG. 1 is an example and embodiments of the present disclosure are not limited thereto. For example, the vehicle control device 100 may further include components (e.g., at least one of a display device, an interface device, or any combination thereof) not shown in FIG. 1.

The sensor device 110 may include at least one of at least one camera, a radar, a lidar, or any combination thereof.

For example, the sensor device 110 may include a front camera and a rear camera.

For example, the front camera may be configured to acquire data about an area including an area in front of a host vehicle.

For example, the rear camera may be configured to acquire data about an area including an area at the rear of the host vehicle.

For example, the sensor device 110 may include the at least one radar configured to determine whether an external object (e.g., a guardrail) existing around the host vehicle exists.

For example, the sensor device 110 may acquire whether the external object exists and/or identification information of the external object based on at least one of a signal strength of a signal acquired using the at least one radar, a distance and a relative speed ratio with respect to the sensed external object, or any combination thereof.

The sensor device 110 may acquire area information about an area adjacent to the host vehicle. For example, the sensor device 110 may acquire information about at least one of a lane in which the host vehicle is traveling, the guardrail adjacent to the host vehicle, or any combination thereof.

For example, the sensor device 110 may acquire an image containing the lane in which the host vehicle is traveling using the at least one camera (e.g., the front camera and/or the rear camera).

For example, the sensor device 110 may acquire an image containing the guardrail adjacent to the host vehicle using the at least one camera (e.g., the front camera and/or the rear camera).

The sensor device 110 may acquire a driving state (e.g., travel state) of the host vehicle based on a specified period (e.g., at predetermined time intervals).

For example, the sensor device 110 may acquire, at predetermined time intervals, at least one of a travel speed, a yaw rate, or any combination thereof of the host vehicle. For example, the predetermined time intervals (e.g., specified period) may be a set value set by a user or a result value of learning data learned based on a performance of the host vehicle.

The controller 120 may be operatively connected to the sensor device 110 and the memory 130. For example, the controller 120 may control an operation of the vehicle control device 100.

For example, the controller 120 may correct a travel direction of the vehicle control device based on the information acquired using the sensor device 110 and update the correction result.

For example, the controller 120 may determine whether the travel direction of the host vehicle needs to be corrected based on the information (e.g., the information about at least one of the lane, the guardrail, or any combination thereof) acquired using at least one sensor (e.g., at least one of the radar, the camera, or any combination thereof) included in the sensor device 110.

For example, the controller 120 may control an information acquiring operation of the sensor device 110 for correcting the travel direction only if at least one of the driving state of the host vehicle, the adjacent area information, or any combination thereof satisfies a specified condition (e.g., a threshold condition).

As an example, the controller 120 may acquire the driving state of the host vehicle using the sensor device 110 at predetermined time intervals, and if the driving state satisfies the specified condition, acquire the information about at least one of the lane, the guardrail, or any combination thereof using the sensor device 110. For example, the specified condition may include at least one of the travel speed, a travel location, a destination, a travel route, the yaw rate, or any combination thereof of the host vehicle.

For example, the controller 120 may acquire the area information about the area adjacent to the host vehicle using the at least one sensor (e.g., at least one of the radar, the camera, or any combination thereof) included in the sensor device 110, and determine, based on at least one of a distance between an object contained (e.g., described) in the area information and the host vehicle, a sensed signal strength of the object, a relative speed ratio between the host vehicle and the object, or any combination thereof, whether the guardrail is contained in the area information (or whether the object corresponds to the guardrail). If the guardrail is contained (or if the object corresponds to the guardrail) in the area information (e.g., if the guardrail is located in the area adjacent to the host vehicle), the controller 120 may acquire the information about at least one of the lane, the guardrail, or any combination thereof using the at least one camera included in the sensor device 110.

For example, the controller 120 may determine whether the travel direction of the host vehicle corresponds to at least one of the lane in which the host vehicle is traveling, the guardrail adjacent to the host vehicle, or any combination thereof.

For example, the controller 120 may determine whether the travel direction of the host vehicle is parallel to at least one of the lane, the guardrail, or any combination thereof based on at least a portion of the acquired information.

For example, if it is determined that the travel direction of the host vehicle does not correspond to at least one of the lane, the guardrail, or any combination thereof, the controller 120 may correct the travel direction of the host vehicle to correspond to at least one of the lane, the guardrail, or any combination thereof.

For example, the controller 120 may determine whether the host vehicle is traveling along a center line of the lane based on at least a portion of the acquired information. If it is determined that the host vehicle is traveling while being spaced apart from the center line by more than a specified distance (e.g., a threshold distance), the controller 120 may correct the travel direction of the host vehicle such that the host vehicle travels closer to the center line.

For example, the controller 120 may monitor a curvature of the lane based on the host vehicle based on at least a portion of the acquired information. If it is determined as a result of the monitoring variation range of the curvature exceeds a specified range (e.g., a threshold range), the controller 120 may correct the travel direction of the host vehicle such that the variation range of the curvature is reduced.

For example, if it is identified based on at least a portion of the acquired information that a reliability value of the lane is equal to or lower than a specified reference value (e.g., a threshold value), the controller 120 may determine that the travel direction does not correspond to at least one of the lane, the guardrail, or any combination thereof. For example, the controller 120 may receive the specified reference value related to the reliability of the lane from the outside (e.g., a server, the user, and an external manufacturer).

The memory 130 may store commands or data. For example, the memory 130 may store one or more instructions that, when executed by the controller 120, cause the vehicle control device 100 to perform various operations.

For example, the memory 130 and the controller 120 may be implemented as a single chipset. The controller 120 may include at least one of a communication processor or a modem.

For example, the memory 130 may store various information associated with the vehicle control device 100. For example, the memory 130 may store information about an operation history of the controller 120. As an example, the memory 130 may store information associated with states of components (e.g., at least one of an engine control unit (ECU), at least one door, the sensor device 110, the controller 120, a display (not shown), or any combination thereof) of the host vehicle.

Figure 2:
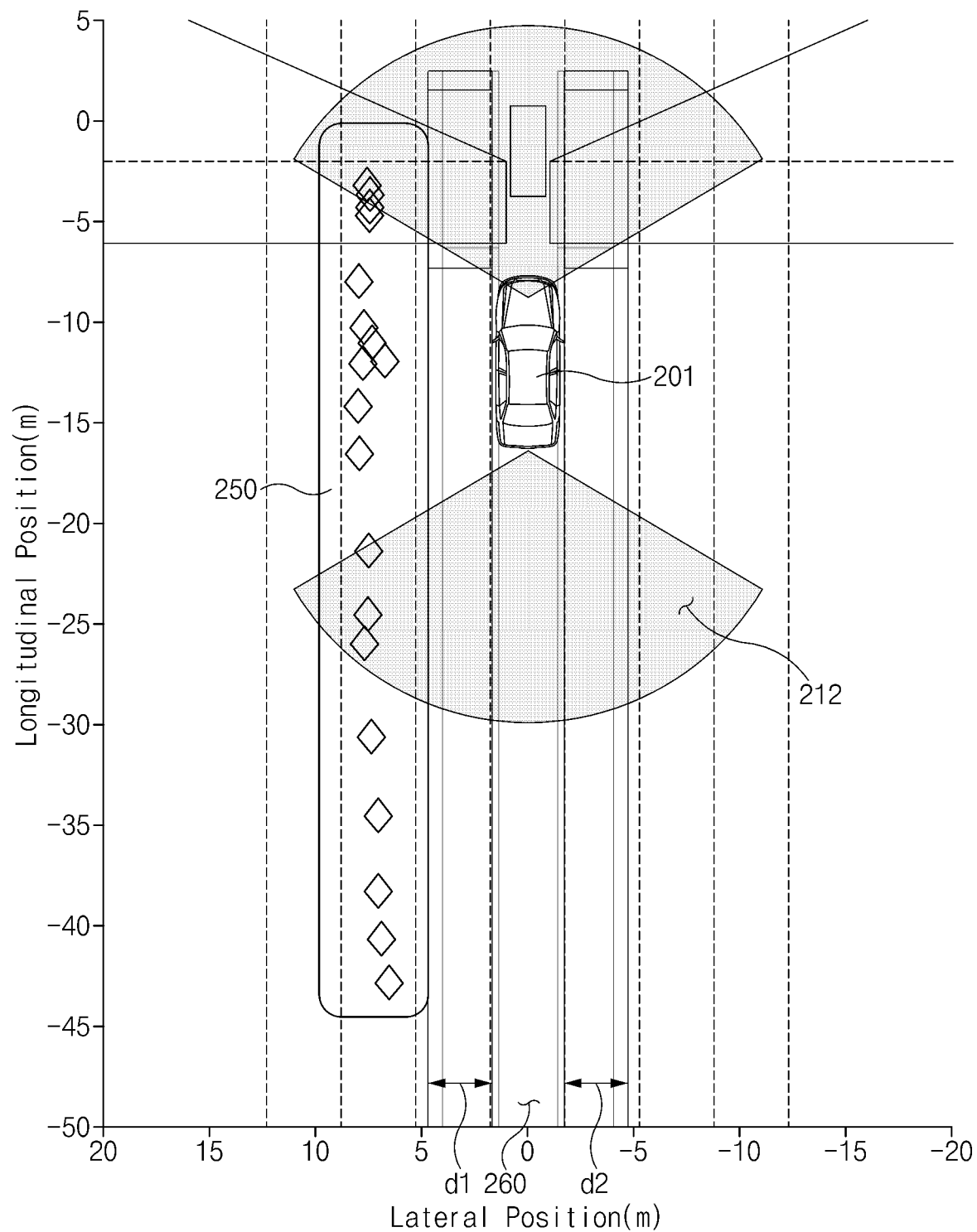
FIG. 2 is a conceptual diagram illustrating an operation of a vehicle control device via a sensor device.

FIG. 2 is a conceptual diagram illustrating an operation of a vehicle control device via a sensor device.

A vehicle control device (e.g., the vehicle control device 100 in FIG. 1) may acquire various information using a sensor device (e.g., the sensor device 110 in FIG. 1).

The vehicle control device may acquire data about an area 211 including an area in front of a host vehicle 201 using a front camera included in the sensor device.

For example, referring to FIG. 2, the data about the area 211 including the area in front of the host vehicle may include at least one of information about a guardrail 250 present on a side of the host vehicle 201, information about a lane 260 in which the host vehicle 201 is traveling, or any combination thereof.

The vehicle control device may acquire data about an area 212 including an area at the rear of the host vehicle 201 using a rear camera included in the sensor device.

For example, referring to FIG. 2, the data about the area 212 including the area at the rear of the host vehicle may include at least one of the information about the guardrail 250 present on the side, the information about the lane 260 in which the host vehicle 201 is traveling, or any combination thereof.

The vehicle control device may determine whether a travel direction of the host vehicle 201 needs to be corrected using at least one of the data acquired using the sensor device. For example, the vehicle control device may determine whether the travel direction of the host vehicle 201 corresponds to (or is parallel to) at least one of the lane, the guardrail, or any combination thereof using at least one of the acquired data.

For example, the vehicle control device may determine whether the host vehicle 201 is traveling along a center line of the lane 260.

For example, the vehicle control device may compare straight-line distances (e.g., d1 and d2) from a center of the host vehicle 201 to both ends of the lane 260 with each other to determine whether the host vehicle 201 is traveling along the center line of the lane 260.

For example, if a difference between the first distance d1 and the second distance d2 exceeds a specified value (e.g., a threshold value), the vehicle control device may determine that the host vehicle 201 is traveling while being spaced apart from the center line of the lane 260 by more than a specified distance (e.g., a threshold distance).

For example, if it is determined that the host vehicle 201 is traveling while being spaced apart from the center line of the lane 260 by more than the specified distance, the vehicle control device may correct the travel direction such that the host vehicle 201 travels close to the center line.

For example, the vehicle control device may monitor (or calculate) a curvature of the lane 260 based on the host vehicle 201.

For example, if it is determined based on the monitoring result that a variation range of curvature exceeds a specified range (e.g., a threshold range), the vehicle control device may correct the travel direction of the host vehicle 201 in a direction in which the variation range of the curvature decreases.

For example, if it is identified that a reliability value of the information about the lane acquired using the sensor device is equal to or lower than a specified reference value (e.g., a threshold value), the vehicle control device may determine that the travel direction does not correspond to at least one of the lane 260, the guardrail 250, or any combination thereof. In this case, the vehicle control device may correct the travel direction of the host vehicle 201.

For example, if it is identified that the travel direction of the host vehicle 201 is not parallel to the guardrail 250, the vehicle control device may correct the travel direction to be parallel to the guardrail 250.

As an example, the vehicle control device may identify an extension direction of the guardrail 250 using the at least one camera included in the sensor device, and correct the travel direction of the host vehicle 201 such that the travel direction of the host vehicle 201 and the extension direction of the guardrail 250 are parallel to each other.

Figure 3:
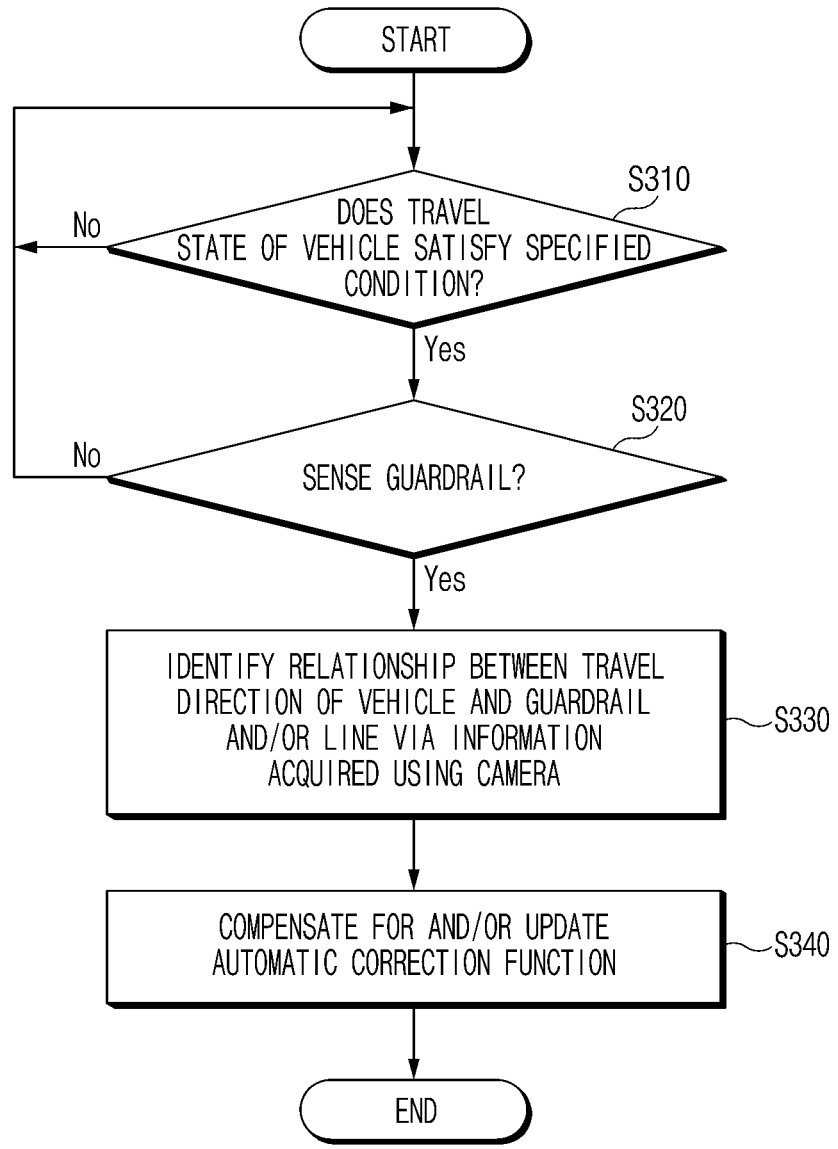
FIG. 3 is an operation flowchart of a vehicle control device.

FIG. 3 is an operation flowchart of a vehicle control device.

A vehicle control device (e.g., the vehicle control device 100 in FIG. 1) may perform operations disclosed in FIG. 3. For example, at least some of components (e.g., the sensor device 110, the controller 120, and the memory 130 in FIG. 1) included in the vehicle control device may be set to perform the operations in FIG. 3.

Operations from S310 to S340 may be performed sequentially, but are not necessarily performed sequentially. For example, an order of each operation may be changed, or at least two operations may be performed in parallel with each other. In addition, contents with respect to FIG. 3 corresponding to or duplicated with the above-described contents may be briefly described or omitted.

The vehicle control device may determine whether the driving state of the vehicle satisfies the specified condition (S310) (e.g., a threshold condition).

For example, the vehicle control device may determine whether at least one of the travel speed, the travel location, the destination, the travel route, the yaw rate, or any combination thereof of the vehicle satisfies the specified condition using a sensor device (e.g., the sensor device 110 in FIG. 1).

For example, the vehicle control device may determine that the driving state of the vehicle satisfies the specified condition if the travel speed of the vehicle is greater than or equal to a specified value (e.g., a threshold value), the yaw rate is less than a specified value, or the state corresponds to at least one of any combination thereof.

For example, if it is determined that the driving state of the vehicle satisfies the specified condition (e.g., operation S310—Yes), the vehicle control device may perform operation S320.

For example, if it is determined that the driving state of the vehicle does not satisfy the specified condition (e.g., operation S310—No), the vehicle control device may repeat operation S310.

The vehicle control device may sense the guardrail (S320).

For example, the vehicle control device may sense the guardrail in the area adjacent to the vehicle using at least one sensor (e.g., a radar and/or a camera) included in the sensor device.

For example, the vehicle control device may acquire the area information of the area adjacent to the vehicle using the at least one sensor device.

For example, the vehicle control device may determine, based on at least one of the distance between the object contained in the area information and the host vehicle, the sensed signal strength of the object, the relative speed ratio between the host vehicle and the object, or any combination thereof, whether the guardrail is contained in the area information (or whether the object corresponds to the guardrail).

For example, if the guardrail is sensed in the area adjacent to the vehicle (e.g., operation S320—Yes), the vehicle control device may perform operation S330.

For example, if the guardrail is not sensed in the area adjacent to the vehicle (e.g., operation S320—No), the vehicle control device may repeat operation S310.

The vehicle control device may identify a relationship between the travel direction of the vehicle and the guardrail and/or the lane via the information acquired using the camera (S330).

For example, the vehicle control device may determine whether the travel direction of the vehicle is parallel to the guardrail and/or the lane.

For example, the vehicle control device may determine that the travel direction is parallel to the guardrail and/or the lane if a distance between the center of the vehicle and a center of the lane is consistently maintained.

For example, the vehicle control device may monitor the curvature of the lane based on the vehicle, and if it is determined based on the monitoring result that the variation range of the curvature is equal to or smaller than the specified range, determine that the travel direction is parallel to the guardrail and/or the lane.

For example, if the reliability value of the information about the lane acquired using the camera exceeds the specified reference value, the vehicle control device may determine that the travel direction is parallel to the guardrail and/or the lane.

The vehicle control device may compensate for and/or update an automatic correction function of the travel direction (S340).

For example, if it is determined based on the result of operation S330 that the travel direction of the vehicle is not parallel to the guardrail and/or the lane, the vehicle control device may correct the travel direction and update the automatic correction function.

Figure 4:
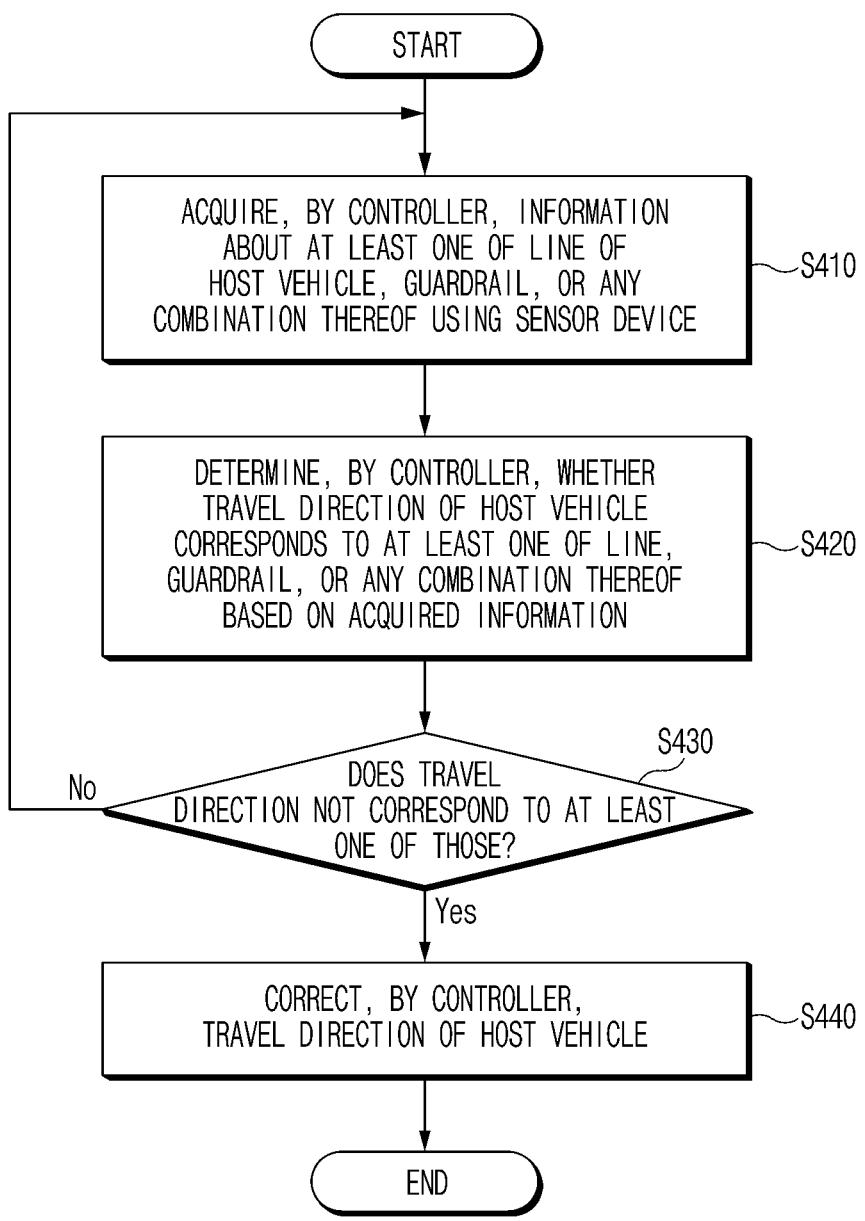
FIG. 4 is an operation flowchart of a vehicle control device.

FIG. 4 is an operation flowchart of a vehicle control device.

A vehicle control device (e.g., the vehicle control device 100 in FIG. 1) may perform operations disclosed in FIG. 4. For example, at least some of components (e.g., the sensor device 110, the controller 120, and the memory 130 in FIG. 1) included in the vehicle control device may be set to perform the operations in FIG. 4.

Operations from S410 to S440 may be performed sequentially, but are not necessarily performed sequentially. For example, an order of each operation may be changed, or at least two operations may be performed in parallel with each other. In addition, contents with respect to FIG. 4 corresponding to or duplicated with the above-described contents may be briefly described or omitted.

The controller may acquire the information about at least one of the lane in which the host vehicle is traveling, the guardrail adjacent to the host vehicle, or any combination thereof using the sensor device (S410).

For example, the controller may control the information acquiring operation of the sensor device for correcting the travel direction only if at least one of the driving state of the host vehicle, the adjacent area information, or any combination thereof satisfies the specified condition.

As an example, the controller may acquire the driving state of the host vehicle using the sensor device at predetermined time intervals, and if the driving state satisfies the specified condition, acquire the information about at least one of the lane, the guardrail, or any combination thereof using the sensor device. For example, the specified condition may include at least one of the travel speed, the travel location, the destination, the travel route, the yaw rate, or any combination thereof of the host vehicle.

As an example, the controller may acquire the area information about the area adjacent to the host vehicle using the at least one sensor (e.g., at least one of the radar, the camera, or any combination thereof) included in the sensor device, and determine, based on at least one of the distance between the object contained in the area information and the host vehicle, the sensed signal strength of the object, the relative speed ratio between the host vehicle and the object, or any combination thereof, whether the guardrail is contained in the area information (or whether the object corresponds to the guardrail). If the guardrail is contained (or when it is identified that the object corresponds to the guardrail) in the area information (e.g., if the guardrail is located in the area adjacent to the host vehicle), the controller may acquire the information about at least one of the lane, the guardrail, or any combination thereof using the at least one camera included in the sensor device.

The controller may determine whether the travel direction of the host vehicle corresponds to at least one of the lane, the guardrail, or any combination thereof based on at least a portion of the acquired information (S420).

For example, the controller may determine whether the travel direction of the host vehicle is parallel to at least one of the lane, the guardrail, or any combination thereof based on at least a portion of the acquired information.

The controller may determine whether the travel direction of the host vehicle corresponds to at least one of the lane, the guardrail, or any combination thereof (S430).

For example, if it is determined that the travel direction does not correspond to at least one of those (e.g., operation S430—Yes), the vehicle control device may perform operation S440.

For example, if it is determined that the travel direction corresponds to at least one of those (e.g., operation S430—No), the vehicle control device may repeatedly perform operation S410.

The controller may correct the travel direction of the host vehicle (S440).

For example, if it is determined that the travel direction of the host vehicle does not correspond to at least one of the lane, the guardrail, or any combination thereof, the controller may correct the travel direction of the host vehicle to correspond to at least one of the lane, the guardrail, or any combination thereof.

For example, the controller may determine whether the host vehicle is traveling along the center line of the lane based on at least a portion of the acquired information. if it is determined that the host vehicle is traveling while being spaced apart from the center line by more than the specified distance, the controller may correct the travel direction of the host vehicle such that the host vehicle travels close to the center line.

For example, the controller may monitor the curvature of the lane based on the host vehicle based on at least a portion of the acquired information. if it is determined as a result of the monitoring that the variation range of the curvature exceeds the specified range, the controller may correct the travel direction of the host vehicle such that the variation range of the curvature is reduced.

For example, if it is identified based on at least a portion of the acquired information that the reliability value of the lane is equal to or lower than the specified reference value, the controller may determine that the travel direction does not correspond to at least one of the lane, guardrail, or any combination thereof and correct the travel direction. For example, the controller may receive the specified reference value associated with the reliability of the lane from the outside (e.g. the server, user, the and the external manufacturer).

Figure 5:
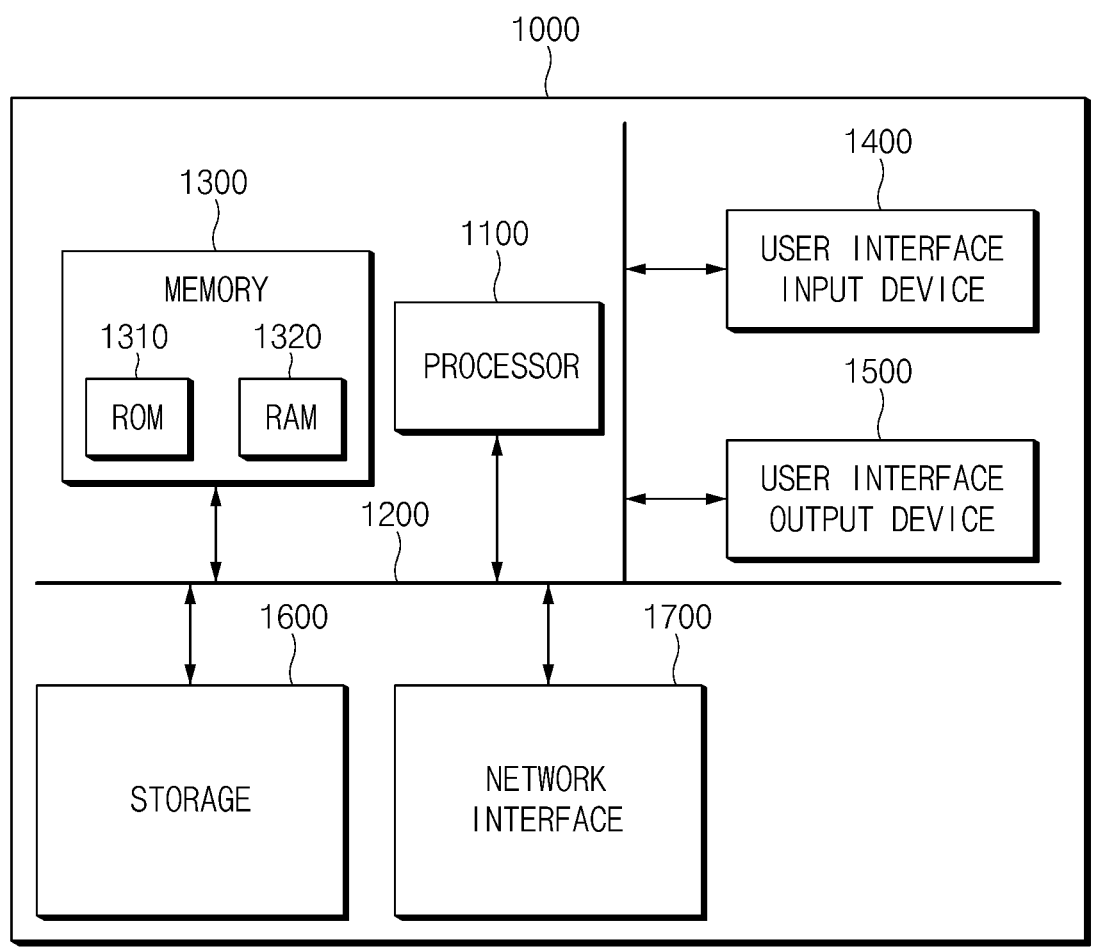
FIG. 5 is a diagram illustrating a computing system related to a vehicle control method.

FIG. 5 is a diagram illustrating a computing system related to a vehicle control method.

Referring to FIG. 5, a computing system 1000 related to a vehicle control method may include at least one processor 1100, a memory 1300, a user interface input device 1400, a user interface output device 1500, storage 1600, and a network interface 1700 connected via a bus 1200.

The processor 1100 may be a central processing unit (CPU) or a semiconductor device that performs processing on commands stored in the memory 1300 and/or the storage 1600. The memory 1300 and the storage 1600 may include various types of volatile or non-volatile storage media. For example, the memory 1300 may include a ROM (Read Only Memory) and a RAM (Random Access Memory).

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM.

The exemplary storage medium is coupled to the processor 1100, which may read information from, and write information to, the storage medium. In another method, the storage medium may be integral with the processor 1100. The processor and the storage medium may reside within an application specific integrated circuit (ASIC). The ASIC may reside within the user terminal. In another method, the processor and the storage medium may reside as individual components in the user terminal.

The description above is merely illustrative of the technical idea of the present disclosure, and various modifications and changes may be made by those skilled in the art without departing from the essential characteristics of the present disclosure.

Therefore, the embodiments disclosed in the present disclosure are not intended to limit the technical idea of the present disclosure but to illustrate the present disclosure, and the scope of the technical idea of the present disclosure is not limited by the embodiments. The scope of the present disclosure should be construed as being covered by the scope of the appended claims, and all technical ideas falling within the scope of the claims should be construed as being included in the scope of the present disclosure.

Effects of the device and the method for controlling the vehicle according to the present disclosure will be described below.

According to at least one of the embodiments of the present disclosure, a control time for travel of the host vehicle may be drastically reduced in an emergency situation as various information related to the travel of the host vehicle may be quickly acquired using a plurality of cameras.

In addition, according to at least one of the embodiments of the present disclosure, relatively high accuracy and safety may be secured as the travel of the host vehicle is controlled by precisely analyzing the data acquired using the plurality of cameras to a minute level.

In addition, according to the present disclosure, safety and usability of the user may be improved as the travel direction is quickly and accurately changed and/or maintained for the vehicle to travel parallel to the guardrail and/or the lane while traveling.

In addition, various effects identified directly or indirectly through the present document may be provided.

Hereinabove, although the present disclosure has been described with reference to one or more embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A device for controlling a vehicle, the device comprising:
   at least one sensor;
   a controller; and
   memory storing instructions that, when executed by the controller, cause the device to:
      acquire, using the at least one sensor, information about at least one of:
         a lane in which the vehicle is traveling, or
         a guardrail adjacent to the vehicle;

determine, based on the information, whether a travel direction of the vehicle corresponds to at least one of the lane or the guardrail; and correct the travel direction of the vehicle based on a determination that the travel direction does not correspond to at least one of the lane or the guardrail, wherein the instructions, when executed by the controller, cause the device to acquire the information by:

acquiring, using the at least one sensor, area information about an area adjacent to the vehicle;

determining whether the guardrail is contained in the area information; and acquiring, based on a determination that the guardrail is contained in the area information, the information.

2. The device of claim 1, wherein the instructions, when executed by the controller, cause the device to determine whether the travel direction of the vehicle corresponds to at least one of the lane or the guardrail by determining, based on at least a portion of the information, whether the travel direction of the vehicle is parallel to at least one of the lane or the guardrail.

3. The device of claim 1, wherein the instructions, when executed by the controller, further cause the device to:

determine, based on the information, whether the vehicle is traveling along a center line of the lane; and based on a determination that a distance between the vehicle and the center line is greater than a threshold distance, correct the travel direction of the vehicle to reduce the distance.

4. The device of claim 1, wherein the instructions, when executed by the controller, further cause the device to:

monitor, based on the information, a curvature of the lane; and based on a determination that a variation range of the curvature is greater than a threshold range, correct the travel direction of the vehicle to reduce the variation range.

5. The device of claim 1, wherein the instructions, when executed by the controller, further cause the device to determine that the travel direction does not correspond to at least one of the lane or the guardrail based on at least a portion of the information indicating that a reliability value of the lane is less than or equal to a specified reference value.

6. The device of claim 1, wherein the instructions, when executed by the controller, further cause the device to:

acquire, using the at least one sensor at predetermined time intervals, a driving state of the vehicle; and acquire, based on the driving state satisfying a specified condition, the information.

7. The device of claim 1, wherein the instructions, when executed by the controller, cause the device to:

determine whether the guardrail is contained in the area information based on at least one of:

a distance between an object, indicated by the area information, and the vehicle, a sensed signal strength of the object, or a relative speed ratio between the vehicle and the object.

8. The device of claim 1, wherein the at least one sensor comprises at least one of:

a front camera configured to acquire data about an area in front of the vehicle; or a rear camera configured to acquire data about an area behind the vehicle.

9. A method comprising:

acquiring, by a controller and using at least one sensor, information about at least one of:

a lane in which a vehicle is traveling, or a guardrail adjacent to the vehicle;

determining, by the controller and based on the information, whether a travel direction of the vehicle corresponds to at least one of the lane or the guardrail; and correcting, by the controller, the travel direction of the vehicle based on a determination that the travel direction does not correspond to at least one of the lane or the guardrail, wherein the acquiring the information comprises:

acquiring, by the controller and using the at least one sensor, area information about an area adjacent to the vehicle;

determining whether the guardrail is contained in the area information; and acquiring, by the controller and based on a determination that the guardrail is contained in the area information, the information.

10. The method of claim 9, wherein the determining, by the controller, of whether the travel direction of the vehicle corresponds to at least one of the lane or the guardrail comprises:

determining, by the controller and based on the information, whether the travel direction of the vehicle is parallel to at least one of the lane or the guardrail.

11. The method of claim 9, wherein the correcting, by the controller, of the travel direction comprises:

determining, by the controller and based on the information, whether the vehicle is traveling along a center line of the lane; and based on a determination that a distance between the vehicle and the center line is greater than a threshold distance, correcting, by the controller, the travel direction of the vehicle to reduce the distance.

12. The method of claim 9, wherein the correcting, by the controller, of the travel direction comprises:

monitoring, by the controller and based on the information, a curvature of the lane; and based on a determination that a variation range of the curvature is greater than a threshold range, correcting, by the controller, the travel direction of the vehicle to reduce the variation range.

13. The method of claim 9, wherein the determining of whether the travel direction of the vehicle corresponds to at least one of the lane or the guardrail comprises:

determining, by the controller, that the travel direction does not correspond to at least one of the lane or the guardrail based on at least a portion of the information indicating that a reliability value of the lane is less than or equal to a specified reference value.

14. The method of claim 9, wherein the acquiring of the information comprises:

acquiring, by the controller and based on a driving state of the vehicle satisfying a specified condition, the information.

15. The method of claim 9, wherein the determining of whether the guardrail is contained in the area information is based on at least one of:

a distance between an object, indicated by the area information, and the vehicle, a sensed signal strength of the object, or a relative speed ratio between the vehicle and the object.

16. A computer-readable recording medium storing instructions that, when executed by one or more processors, cause a vehicle to perform:
    acquiring, using at least one sensor, information about at least one of:
        a lane in which the vehicle is traveling, or
        a guardrail adjacent to the vehicle;
    determining, based on the information, whether a travel direction of the vehicle corresponds to at least one of the lane or the guardrail; and
    correcting the travel direction of the vehicle based on a determination that the travel direction does not correspond to at least one of the lane or the guardrail,
    wherein the acquiring the information comprises:
        acquiring, using the at least one sensor, area information about an area adjacent to the vehicle;
        determining whether the guardrail is contained in the area information; and
        acquiring, based on a determination that the guardrail is contained in the area information, the information.

17. The computer-readable recording medium of claim 16, wherein the instructions, when executed by the one or more processors, cause the vehicle to determine whether the travel direction of the vehicle corresponds to at least one of the lane or the guardrail by:
    determining, based on the information, whether the travel direction of the vehicle is parallel to at least one of the lane or the guardrail.

18. The computer-readable recording medium of claim 16, wherein the instructions, when executed by the one or more processors, cause the vehicle to correct the travel direction of the vehicle by:
    determining whether the vehicle is traveling along a center line of the lane; and
    based on a determination that a distance between the vehicle and the center line is greater than a threshold distance, correcting the travel direction of the vehicle to reduce the distance.

19. The computer-readable recording medium of claim 16, wherein the instructions, when executed by the one or more processors, cause the vehicle to correct the travel direction by:
    monitoring, based on the information, a curvature of the lane; and
    based on a determination that a variation range of the curvature is greater than a threshold range, correcting the travel direction of the vehicle to reduce the variation range.

20. The computer-readable recording medium of claim 16, wherein the instructions, when executed by the one or more processors, cause the vehicle to determine whether the travel direction of the vehicle corresponds to at least one of the lane or the guardrail by:
    determining that the travel direction does not correspond to at least one of the lane or the guardrail based on at least a portion of the information indicating that a reliability value of the lane is less than or equal to a specified reference value.

* * * * *